Patented Aug. 17, 1954

2,686,721

UNITED STATES PATENT OFFICE 2,686,721

PIECRUST MIX

Robert W. Callaghan and Louis H. Dorger, Minneapolis, Minn., assignors to General Mills, Inc., a corporation of Delaware No Drawing. Application April 11, 1952, Serial No. 281,916

7 Claims. (Cl. 99—94)

The present invention relates to a pie crust mix having unusual properties.

Pie crust mixes ordinarily contain flour, shortening and salt as the principal ingredients. In order to produce a satisfactory pie crust it is necessary that the mix contain at least about 30% shortening. Below this level the pie crust does not having the desirable eating characteristics usually sought. Pie crusts of excellent quality may contain up to 40–45% shortening. These high shortening levels create no particular problem when the pie crust is prepared in the home directly from the individual ingredients. However when it is attempted to prepare a pie crust mix which must be packaged and stored for extended periods of time, the high fat levels present numerous problems.

In the conventional process of making pie crust mixes the mixing required to distribute the shortening relatively uniformly, necessarily results in the coating of some of the flour particles with shortening such that the mix acquires a somewhat greasy feel. At high shortening levels, and particularly where the shortening employed is relatively soft as is frequently desirable, it is found that the entire quantity of pie crust mix contained within a package may set to a complete block, which phenomenon is referred to as "blocking." Blocking is likely to occur when the product is subjected to temperatures of 100° F. or more and to agitation, which conditions frequently occur during shipment during certain portions of the year. When the product becomes blocked it is no longer a free-flowing powder, but is a solid block of material which is unattractive and extremely difficult to work into a suitable form for rolling out into a pie crust.

The problem of blocking is aggravated by soft shortenings and by high shortening levels. The use of high melting point shortenings to reduce the tendency toward blocking results in a reduced quality of the crust prepared from such a mix. As a result of these difficulties it is found that most pie crust mixes are limited in shortening content to somewhere within the range of 30–35%, and usually within the lower portions of this range. In addition, harder shortenings are employed than would be desirable for optimum baking characteristics. It has now been discovered that these difficulties may be overcome by means of the present invention which permits the employment of relatively high shortening levels, most of the shortening being of the desirable soft type.

It is therefore an object of the present invention to provide a novel pie crust mix characterized by high shortening levels of predominantly relatively soft shortening, which mix is resistant to blocking and possesses the characteristics suitable for the production of a high quality pie crust.

The objects of the present invention are obtained by the preparation of a pie crust mix which contains a relatively high level of shortening, most of which is soft but a small proportion of which is relatively hard. The soft portion of the shortening is relatively uniformly distributed through the mix and is supplemented by discrete particles of a harder shortening which are added separately and which are distributed uniformly through the mix. The use of the soft shortening as less than the whole shortening complement permits the shortening to be spread out through the flour more uniformly and permits the flour to be more thoroughly coated with the shortening without creating any danger of blocking. The small particles of harder shortening are separately formed and are added to the mix thus prepared. The only additional mixing which is necessary is a relatively brief period of mixing sufficient to distribute the discrete particles of the harder shortening. The particles of relatively hard shortening are preferably in the form of flakes or platelets and these flakes or platelets remain intact through the mixing operation and even during the preparation of the dough and the rolling out of the dough. They are found in the pie crust before baking and result in a definite flakiness in the pie crust itself.

In general, the pie crust mixes of the present invention contain from 30–45% of total shortening. Of this, from about 25% to about 35% may be of a relatively soft shortening which may have a melting point within the range of 100–120° F. All melting points referred to herein and in the claims are Wiley melting points.

The harder shortening which is employed in the form of discrete particles usually comprises from 3% to 15% of the mix and usually melts within the range of 125–145° F. A preferred melting point is around 135°–140° F. These harder fats are preferably employed in the form of flakes. There are on the market products known as "lard flakes" which usually melt around 142° F. These may be employed as such, but in general it is preferred to produce flakes which melt at a somewhat lower temperature. For example, commercial lard flakes or fully hydrogenated vegetable oils may be melted and mixed with lower melting fats to yield a product which melts at around 135–140° F. This mixture may then be flaked on a drum chilled by water to around 40° F. At this temperature the mixture of fats is quite brittle and will readily chip off the chilled drum by means of the usual doctor blade.

In the preparation of the mix at least a portion of the softer shortening is thoroughly greased onto the flour. This reduces the absorption of the flour which is the tendency of the flour to take up water when the dough is prepared from the mix. When flour is mixed with water the gluten develops to a tough elastic dough. This is the type of structure desired in the preparation of raised baked products such as bread.

However, in the preparation of pie crust the most tender products are obtained where the gluten development is limited. By thoroughly incorporating the soft shortening onto the flour, the tendency for the development of toughness is reduced. In order to control the amount of shortening greased onto the flour, it is desirable in some instance to smear only a portion of the soft shortening onto the flour and to mix the remainder of the soft shortening somewhat less thoroughly. This two stage addition of the soft shortening is not essential but does provide a better control of the amount of shortening greased onto the flour and also permits adjustments in greasing to fit the various types of flour which may be employed.

When the soft shortening has been thoroughly incorporated, the discrete particles of the harder fat are incorporated and gently mixed into the product. Where two stage mixing of the soft shortening is employed, the harder fat particles are preferably added with the second portion of the soft shortening. In this way the product possesses the total quantity of fat necessary for the production of a desirable crust, while at the same time the quantity of shortening which is greased onto the flour is sufficiently uniform so as to provide uniform dough-handling properties. The product is stable in storage and in shipping and results in the production of a quality of crust not possible heretofore from prepared pie mixes.

*Examples*

A series of batches were prepared having the composition given in the following table. In each of these batches the soft shortening employed was a lard melting at around 120° F. The flakes were a mixture of fats melting around 135–140° F. and were prepared by melting commercial lard flakes melting at 142° F. with lard melting at around 120° F. and by flaking this melted mixture on a drum chilled with water to around 40° F. In each instance the soft shortening was added in two stages, 16 parts of the shortening being thoroughly greased onto the flour in the first stage of mixing, and the remaining portion of the soft shortening being added with the flakes, the second stage of mixing being relatively short for the purpose of merely distributing the flakes and the particles of softer shortening through the mix.

Pie crust doughs were prepared from these batches by mixing 127 grams of the mix with 22.5 cc. of water and mixing the dough. The doughs were then rolled out into crusts and the crusts baked. The effect of flakiness and tenderness is indicated in the table below.

| Sample | Flour | Soft Shortening | Flakes | Salt | Flakiness | Tenderness |
|---|---|---|---|---|---|---|
| Control A | 73 | 25 | 0 | 2 | Mealy | 8 |
| 1A | 68 | 25 | 5 | 2 | Medium flaky | 9 |
| 2A | 63 | 25 | 10 | 2 | do | 9+ |
| Control B | 66 | 32 | 0 | 2 | Sl. mealy | 9 |
| 1B | 61 | 32 | 5 | 2 | Very flaky | 12 |
| 2B | 56 | 32 | 10 | 2 | do | 12+ |
| 3B | 51 | 32 | 15 | 2 | V. extra flaky | 13 |

These data show that there is a definite improvement in flakiness and tenderness by the employment of the flakes. This is particularly evident when a comparison is made between sample 1A and Control B. Sample 1A is medium flaky, notwithstanding the fact that the total shortening content is 2% less than Control B which is rated as slightly mealy. By this means it is possible to improve the flakiness and tenderness of the crust.

We claim as our invention:

1. A pie crust mix comprising flour and about 30% to about 45% of shortening based on the total weight of the mix, the shortening being composed of from 25% to 35% relatively soft shortening sufficient of which is thoroughly distributed on the flour to give the desired absorption, and from 3% to 15% of a harder fat present in the form of discrete particles distributed through the mix.

2. A pie crust mix comprising flour and about 30% to about 45% of shortening based on the total weight of the mix, the shortening being composed of from 25% to 35% relatively soft shortening sufficient of which is thoroughly distributed on the flour to give the desired absorption, and from 3% to 15% of a harder fat present in the form of flakes distributed through the mix.

3. A pie crust mix comprising flour and about 30% to about 45% of shortening based on the total weight of the mix, the shortening being composed of from 25% to 35% of a relatively soft shortening melting within the approximate range of 100–120° F. sufficient of which is thoroughly distributed on the flour to give desired absorption, and from 3% to 15% of a harder fat melting within the approximate range of 125–145° F. present in the form of flakes distributed through the mix.

4. A pie crust mix comprising flour and shortening, the shortening comprising from 30% to 45% of the total weight of the mix and being composed of from 25% to 35% of a shortening melting within the approximate range of 100–120° F. sufficient of which soft shortening is thoroughly distributed on the flour to give the desired absorption, and from 3% to 15% of a harder fat in the form of flakes melting at approximately 135–140° F., the flakes being distributed through the mix.

5. Process of making a pie crust mix which comprises thoroughly distributing a relatively soft shortening melting within the approximate range of 100–120° F. onto the surface of flour and thereafter introducing into the mixture of flour and soft shortening a smaller quantity of a harder fat in the form of discrete particles, and distributing the particles through the mix.

6. Process of producing a pie crust mix which comprises mixing from 25% to 35% by weight based on the total weight of the mix of a relatively soft shortening melting within the approximate range of 100–120° F. with flour, thoroughly spreading at least a portion of said soft shortening onto the surface of the flour, thereafter adding from 3% to 15% of a harder fat melting at approximately 135–140° F. in the form of discrete particles, and distributing the harder fat through the mix.

7. Process according to claim 6 in which only a portion of the soft shortening is first added to the flour and the remainder thereof is added with the harder fat particles.

References Cited in the file of this patent

UNITED STATES PATENTS

| Number | Name | Date |
|---|---|---|
| 1,070,331 | Ellis | Aug. 12, 1913 |
| 1,117,012 | Estabrook | Nov. 10, 1914 |
| 1,218,116 | Post | Mar. 6, 1917 |
| 1,231,114 | Atkinson | June 26, 1917 |
| 2,520,954 | North | Sept. 5, 1950 |